Jan. 26, 1960   C. H. PEIX   2,922,293
WINDOW MOUNTED AIR CONDITIONING APPARATUS
Filed April 11, 1955   6 Sheets-Sheet 1

INVENTOR
CHARLES H. PEIX

BY Norman S. Blodgett
ATTORNEY

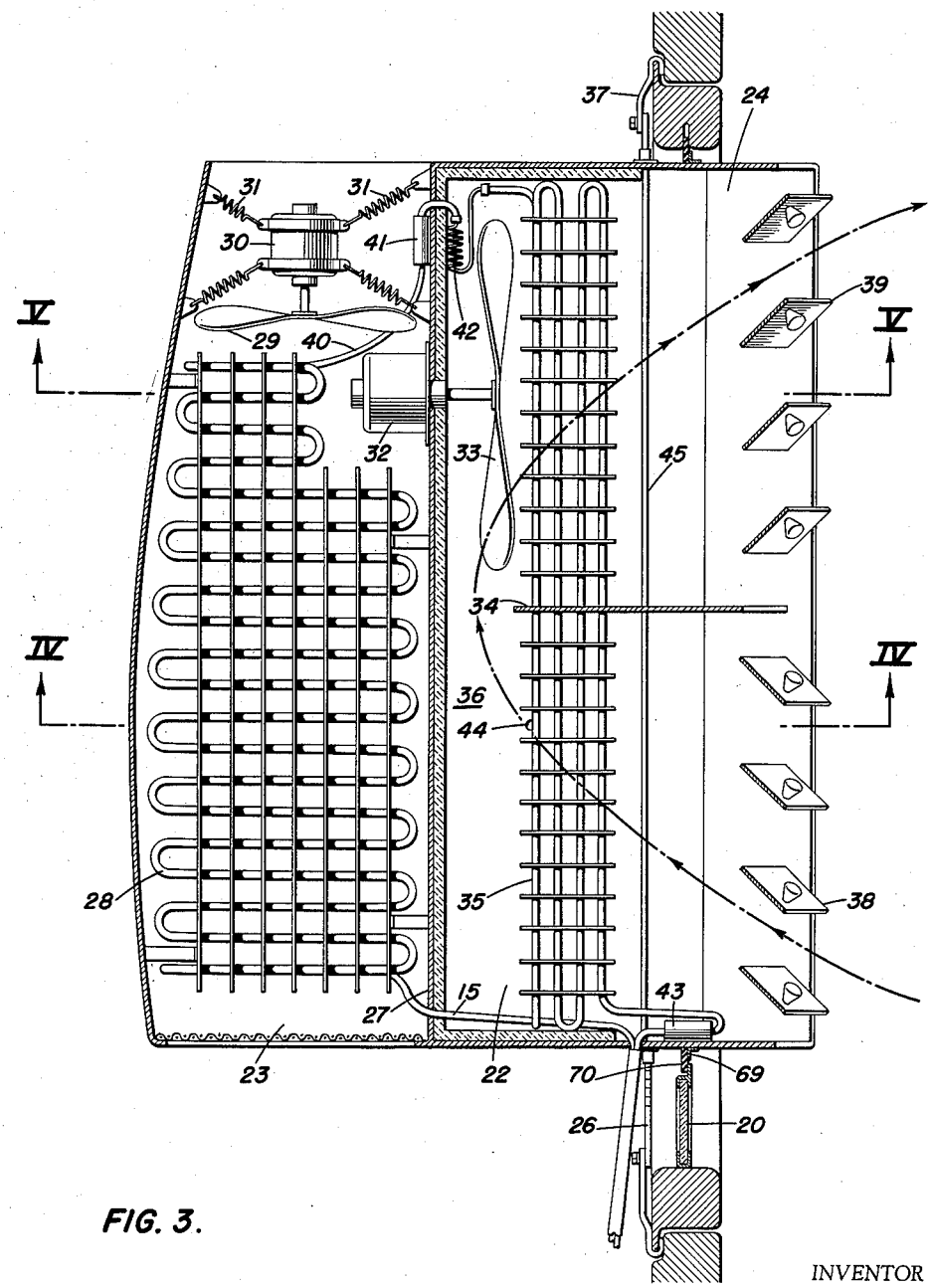
FIG. 3.
INVENTOR
CHARLES H. PEIX
BY 
ATTORNEY

INVENTOR
CHARLES H. PEIX

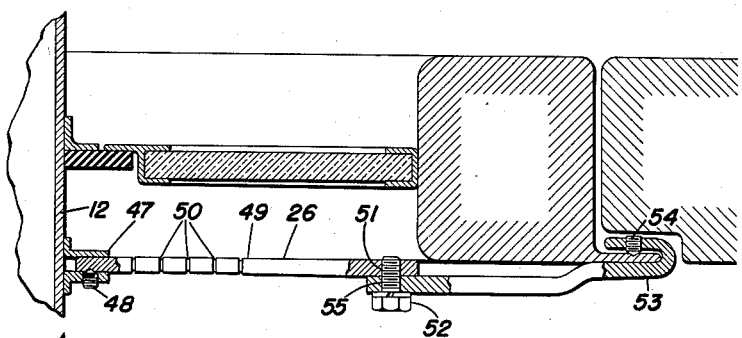
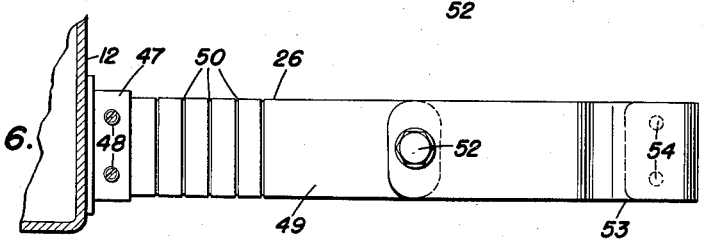
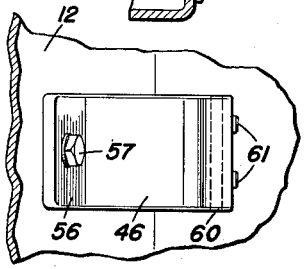
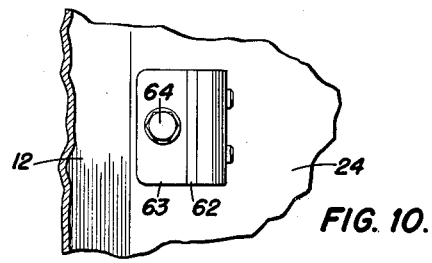
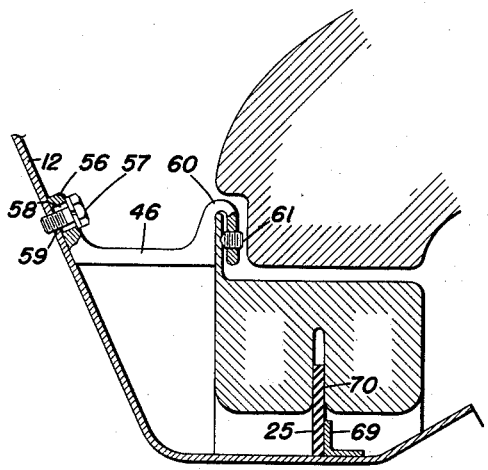
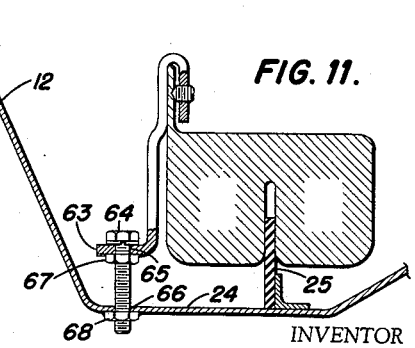
INVENTOR
CHARLES H. PEIX Jan. 26, 1960 C. H. PEIX 2,922,293
WINDOW MOUNTED AIR CONDITIONING APPARATUS
Filed April 11, 1955 6 Sheets-Sheet 5
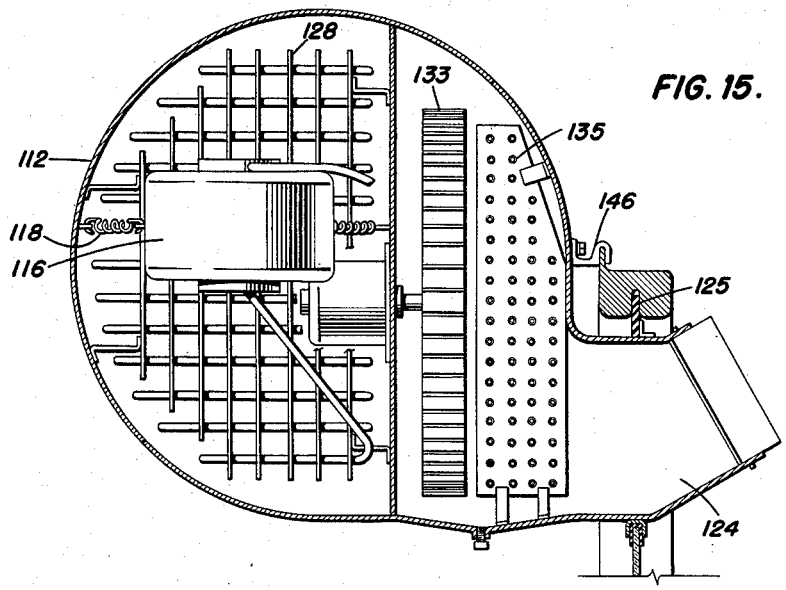
FIG. 15.
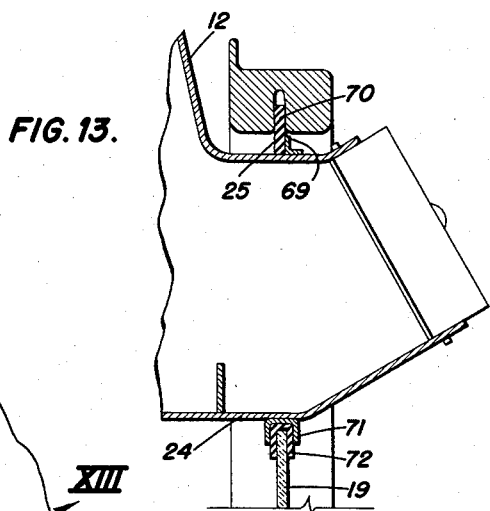
FIG. 13.
FIG. 12.
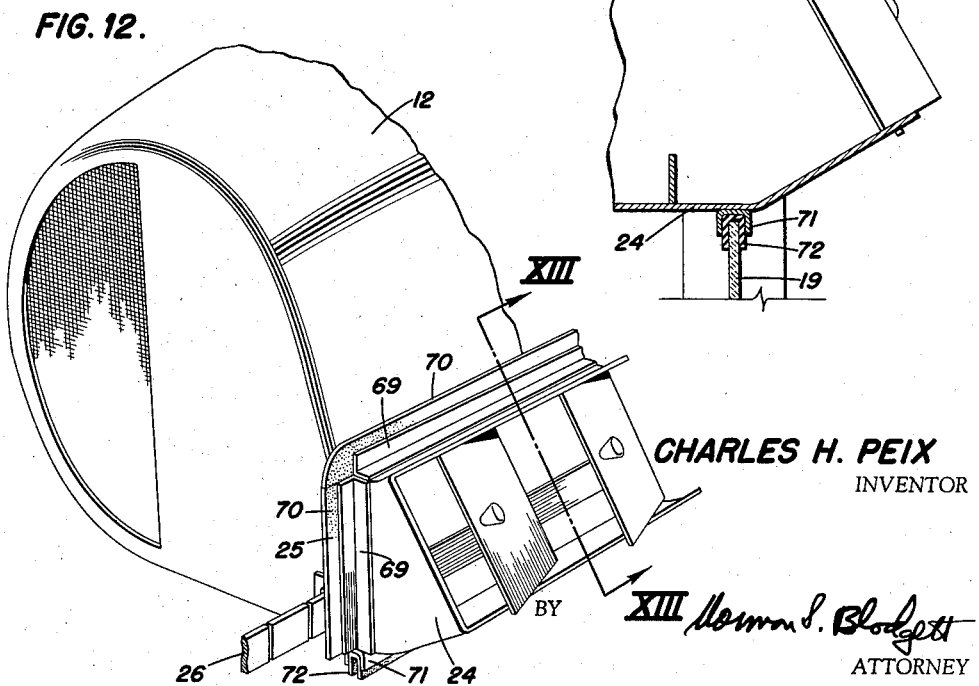
CHARLES H. PEIX
INVENTOR
BY
ATTORNEY Jan. 26, 1960    C. H. PEIX    2,922,293
WINDOW MOUNTED AIR CONDITIONING APPARATUS
Filed April 11, 1955    6 Sheets-Sheet 6

INVENTOR
CHARLES H. PEIX
BY *Norman S. Blodgett*
ATTORNEY

United States Patent Office 2,922,293
Patented Jan. 26, 1960

2,922,293

WINDOW MOUNTED AIR CONDITIONING APPARATUS

Charles H. Peix, Whitinsville, Mass., assignor of one-half to Norman S. Blodgett, Westboro, Mass.

Application April 11, 1955, Serial No. 500,461

9 Claims. (Cl. 62—243)

This invention relates to an air conditioning apparatus and more particularly to apparatus arranged to maintain the air in the interior of a motor vehicle in an optimum condition irrespective of the external conditions.

In the past considerable developmental work has been done to provide an adequate air conditioning unit for an automobile. Such units become more important as time goes on because of the increased demand of consumers for more comfortable riding conditions and also because of the fact that uncomfortable driving conditions lead to accidents because of the inability of the driver to give his best energies to the control of the motor vehicle. However, the devices which have evolved in the past have had many drawbacks, not the least of which was cost. Also, the prior art devices are intended to be mounted in the trunk or under the dashboard of the automobile and involve the use of conduits and wires running around the frame of the motor vehicle; this type of air conditioner usually requires factory installation and skilled service. They are heavy and bulky and do not lend themselves to ease of mounting onto or removal from the vehicle. The present invention obviates these and other defects of the prior art devices in a novel manner.

It is, therefore, an outstanding object of the present invention to provide an air conditioning apparatus particularly adapted to use with a truck, automobile, or any other type of motor vehicle.

Another object of this invention is the provision of an air conditioning apparatus for motor vehicles which is light in weight, small in size, and inexpensive to manufacture.

It is a still further object of the invention to provide an air conditioning apparatus that may be easily and quickly installed or removed from a motor vehicle by unskilled persons.

A further object of the instant invention is the provision of an air conditioning apparatus which requires a minimum of maintenance and supervision.

Another object of the invention is the provision of air conditioning apparatus having a means for attachment to a motor vehicle door and window which will obscure the view by a minimum amount and which will not damage the door or window.

With these and other objects in view, as will be apparent to those skilled in the art, the invention resides in the combination of parts set forth in the specification and covered by the claims appended hereto.

The character of the invention, however, may be best understood by reference to certain of its structural forms, as illustrated by the accompanying drawings in which:

Figure 3 is a horizontal sectional view of the invention taken on the line III—III of Figure 2, Figure 6 is an elevational view of a mounting means constituting a portion of the invention.

Figure 7 is a plan view of the apparatus shown in Figure 6,

Figure 8 is a plan view of a clamping means constituting a portion of the invention, Figure 9 is an elevational view of the apparatus shown in Figure 8, Figure 10 is a plan view of an alternative clamping means for use with the invention, Figure 11 is an elevational view of the device of Figure 10, Figure 12 is a perspective view of a sealing means constituting a portion of the invention, Figure 13 is a sectional view of the invention taken on the line XIII—XIII of Figure 12, particularly showing further details of the sealing means.

Figure 14:
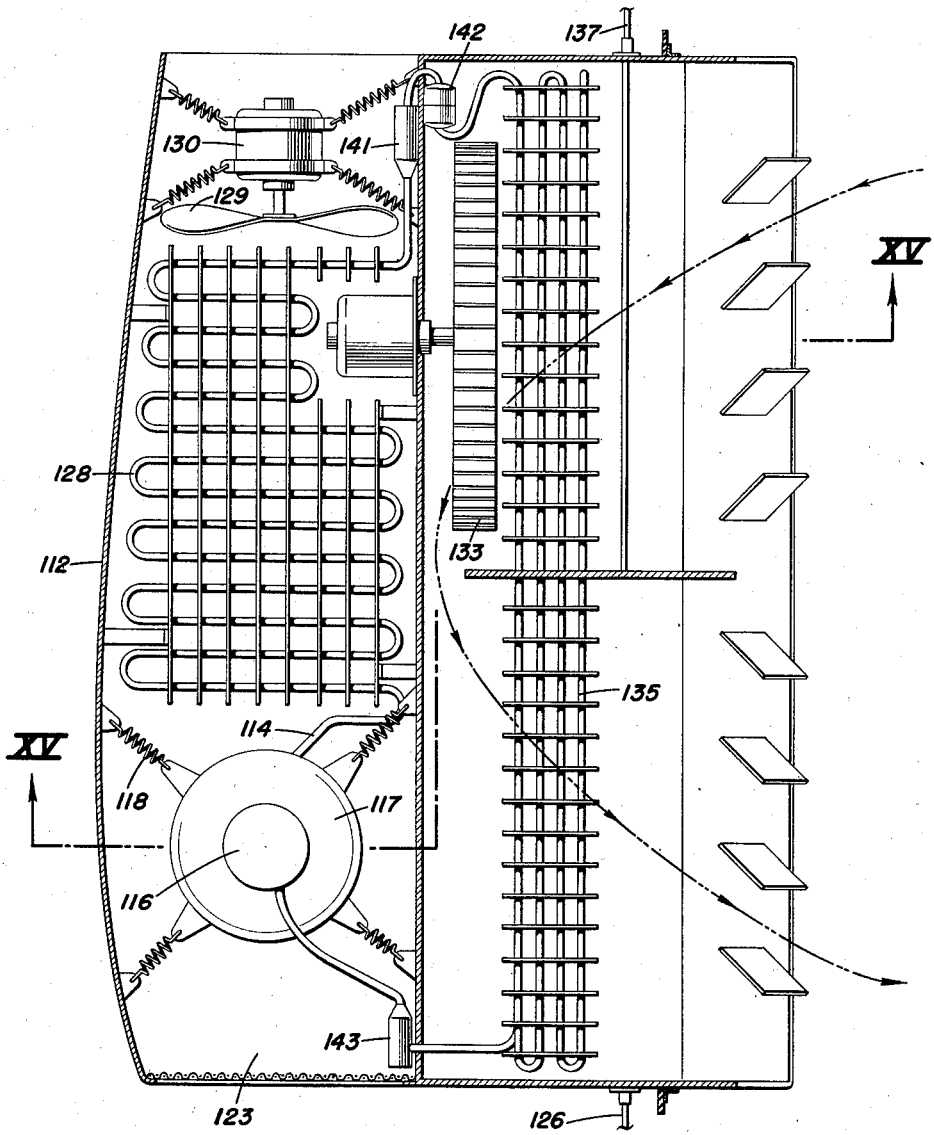

Figure 14 is a horizontal sectional view of a modified version of the invention, and Figure 15 is a transverse vertical sectional view of the invention taken on the line XV—XV of Figure 14.

As used in the following description, the expressions "inner," "outer," "forward," "rearward," "upward," and "downward" refer to similar directions usually used with regard to a truck or automobile.

Figure 1:
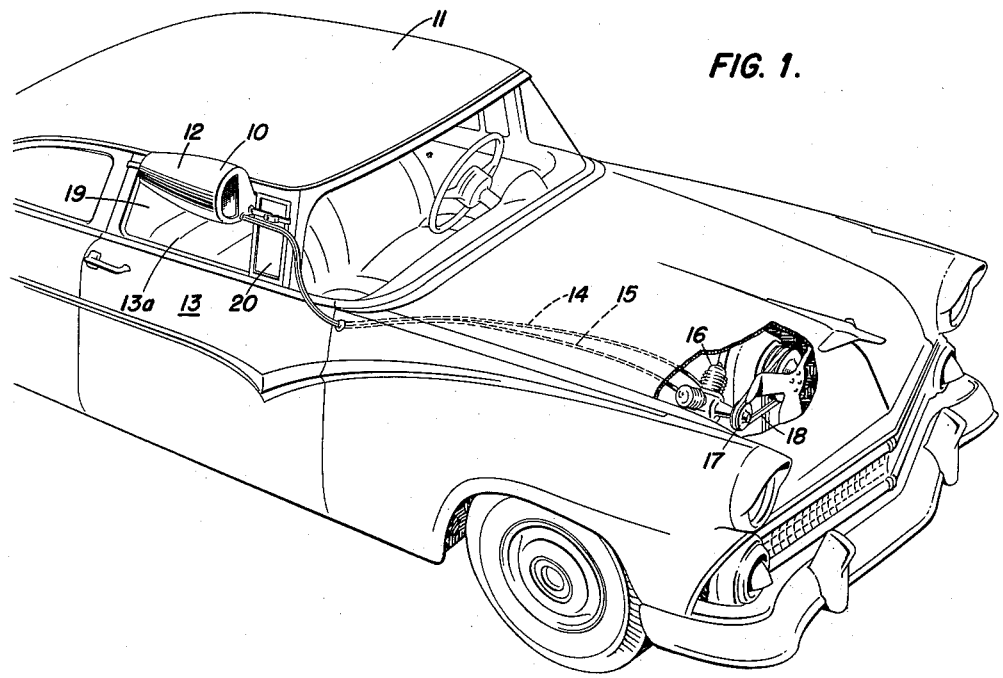
Figure 1 is a perspective view of the invention in use on a motor vehicle.

Referring first to Figure 1, wherein is best shown the general features of the invention, the air conditioning apparatus, designated by the reference numeral 10, is shown in use with a motor vehicle 11. The air conditioning apparatus consists of a main housing 12 mounted on the right front side door 13 of the automobile and is connected by flexible tubes 14 and 15 to a compressor 16. The tube 14 is connected to the low-pressure or inlet opening of the compressor, while the tube 15 is connected to the high-pressure or outlet opening. The compressor is provided with a drive pulley 17 which is connected through a flexible belt 18 or the like to the fan driving system of the motor vehicle. It is to be noted that the window 13a of the automobile consists of a larger, rearward portion 19 which opens downwardly and a smaller, forward portion 20 which opens by pivoting about a vertical axis.

Figure 2:
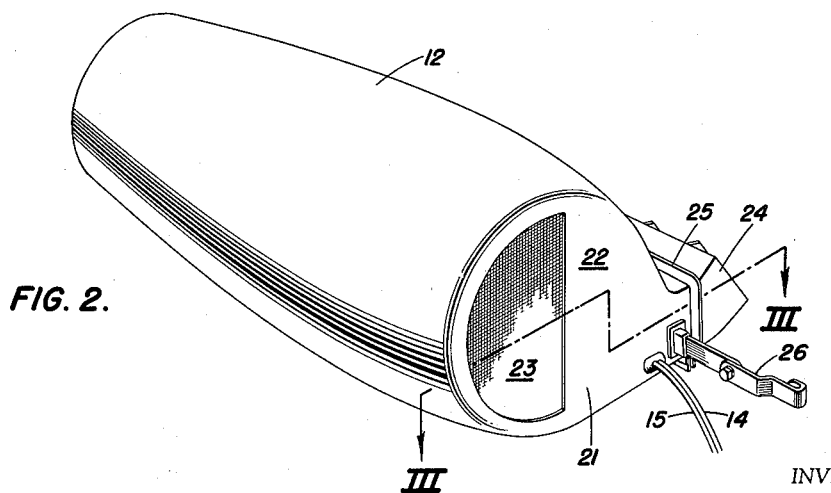
Figure 2 is an enlarged perspective view of a portion of the invention.

Referring next to Figure 2, it can be seen that the main housing 12 of the apparatus is of a generally cylindrical shape with a blunt forward face 21 which is closed at the inner half 22 and provided with a mesh or screen at the outer half 23 of the housing. A substantial duct 24 extends inwardly from the lower half and extends along the entire length of the housing. The duct 24 is provided with a sealing means 25 and a clamping means 26, both of which will be described more fully hereinafter. The tubes 14 and 15 extend from the lower part of the inner half 22.

In Figure 3 can be seen the various elements enclosed by the main housing 12. A vertical wall 27 extends through the center of the housing and divides it into the inner half 22 and the outer half 23 mentioned above. The greater part of the outer half 23 is occupied by a condenser 28 which is a heat exchange comprising finned tubes in the usual manner. The rearward portion of the outer half 23 is occupied by a fan 29 driven by an electric motor 30; the motor is resiliently mounted on springs 31 which are attached to the motor frame and extend in various directions for attachment at their outer ends to the housing proper. An electric motor 32 is mounted on the outer surface of the wall 27 and its shaft extends through the wall and is provided with a fan of the propeller type 33 which resides in the inner half 22 of the housing. It should be noted that the fan 29 occupies substantially the entire cross-section of the rear part of the outer half 23 of the housing, whereas the motor 32 occupies only a small portion thereof and the condenser 28 is formed to provide a space for it. The inner half 22 of the housing is divided into two substantially equal parts by a vertical transverse wall 34 which extends from the inner end of the duct 24 which it divides also to within a substantial distance of the wall 27. The fan resides in the rearward portion formed by the wall 34 and adjacent the wall 27; it occupies a considerable portion of the longitudinal cross-sectional area of this rearward portion. Extending from end to end of the inner half 22 and from lower wall to upper wall thereof is an evaporator 35 which is constructed of finned tubing in the conventional manner in the refrigerator art. In the transverse direction, the evaporator extends from the inner side of the main housing to within a substantial distance of the wall 27; the outer side of the evaporator forms a longitudinal passage 36 with the wall 27 and the housing proper. As can be seen from the drawing, the surfaces of the inner half 22 of the housing, with the exception of the bottom, are well insulated, including the wall 27 and the closed ends. It should be noted that the forward clamping means 26 is matched by a similar rearward clamping means 37. Also, the inner end of the duct 24 is provided with louvers, a set of louvers 38 being situated forwardly of the dividing wall 34, while a set of louvers 39 is located at the portion of the duct rearwardly of the said wall. The louvers 38 and 39 are adjustable so they may be directed to control air flow.

The tube 15, which is connected at one end to the high-pressure side of the compressor 16, is connected at its other end to one side of the condenser 28. The other end of the condenser is connected to a tube 40, leading to a strainer 41 which is, in turn, connected to one end of a restriction such as a capillary tube 42. The other end of the capillary tube is connected to one end of the evaporator 35. The other end of the evaporator is joined to an accumulator or receiver 43 which is connected to the tube 14 leading to the low-pressure side of the compressor 16. A condensate drain 44 is provided in the housing proper under the evaporator.

Figure 4:
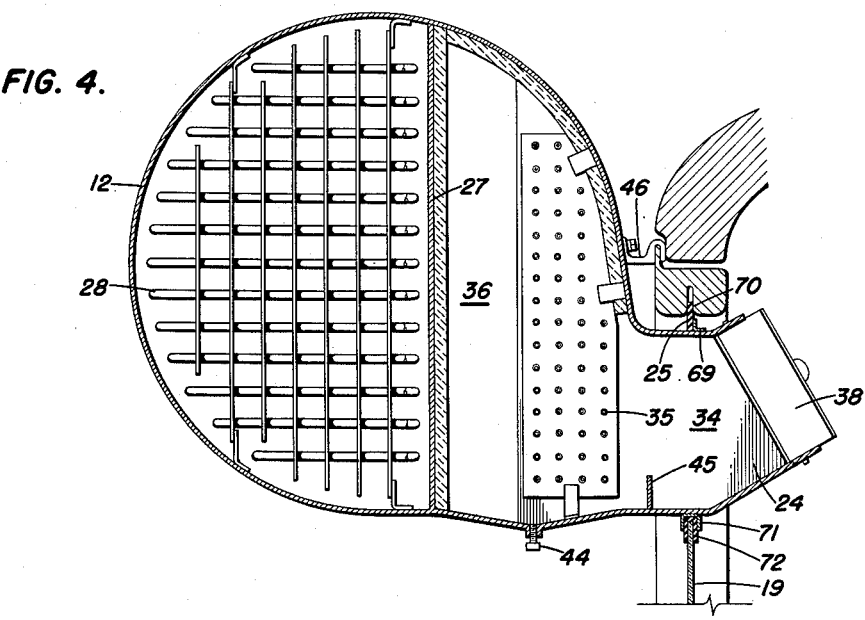
Figure 4 is a vertical transverse sectional view of the invention taken on the line IV of Figure 3.
Figure 5:
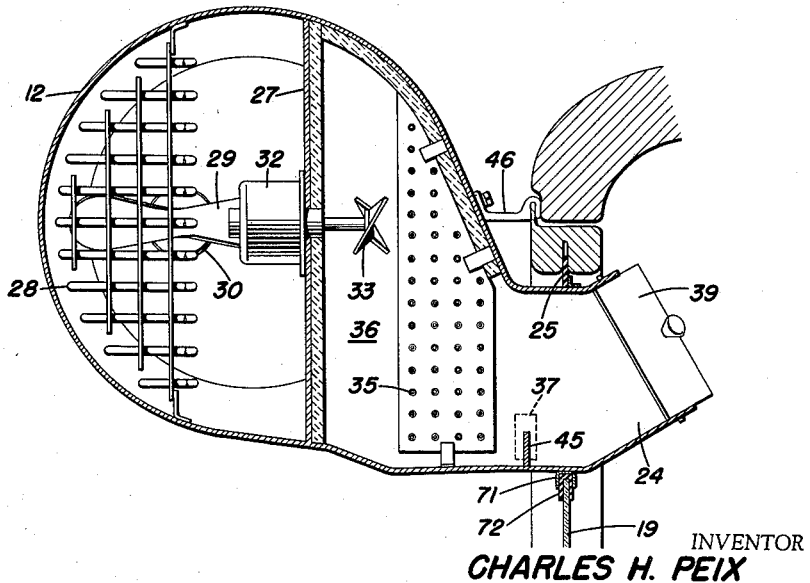
Figure 5 is a vertical transverse sectional view of the invention taken on the line V—V of Figure 3.

Figures 4 and 5 show the relationship of the elements in vertical planes. The condenser 28 is generally semicircular in cross-section. The evaporator 35 is shown as having considerable vertical height. The duct 24 is generally tangential to the bottom of the main body 12, but is turned upwardly at a fairly steep angle. A small condensate baffle 45 is provided across the bottom of the duct. Preferably the housing is pitched downwardly toward the condensate drain, as is evident in the view. A clamping means such as several top door clamps 46 extends from the main housing for connection to the top of the door frame. The relationship of the sealing means 25 to the window 13a of the motor vehicle is clearly shown.

Figures 6 and 7 show the details of construction of the forward clamping means 26; the rearward clamping means 37 is, of course, very similar. A socket member 47 is welded to the forward end of the main housing 12 and is provided with set screws 48. An elongated member 49 has one end which resides in the socket member and is held there by the set screws. This end of the member 49 is provided with notches 50 to facilitate the removal of a portion thereof to make the member of a desired length. The other end of the elongated member 49 is rounded and is provided with a threaded aperture 51 for the reception of a cap screw 52. A hook member 53 formed of strap steel is bent to provide close conformity at one end to the edge of the motor vehicle door; set screws 54 are provided at this end to maintain engagement. The hook member is provided at its other end with an aperture 55 through which the cap screw 52 passes to hold the ends of the hook member and the elongated member in pivotal engagement. The intermediate portion of the hook member is offset to provide for the proper application of the supporting forces to the door edge.

The details of the top door clamp 46 are clearly shown in Figures 8 and 9. The clamp has an end portion 56 which extends vertically along the surface of the main housing 12 and is held thereon by a cap screw 57 extending through a vertically-elongated slot 58 in the end portion into a threaded aperture 59 in the housing. The other end of the clamp 46 is formed into a hook 60 which will fit closely over the top ends of the motor vehicle door; set screws 61 are provided to help to retain the hook in position. The intermediate portion of the clamp is generally straight and is adapted to lie horizontally between the end portion 56 and the hook 60.

An alternate design of top door clamp is shown in Figures 10 and 11 wherein the clamp 62 is shown as comprising an end portion 63 which is adapted to extend horizontally over the horizontal upper surface of the duct 24. The end portion 63 is adjustably connected to the duct 24 by a bolt 64 which passes through an aperture 65 in the end portion and an aperture 66 in the duct; the end portion 63 is clamped between the head of the bolt and a nut 67 and the bolt is threaded into a nut 68 which is welded to the inner surface of the duct in alignment with the aperture 66.

The details of the sealing means 25 are shown in Figures 12 and 13. Along the end and top surfaces of the duct 24, the sealing means consists of an L-section strip 69 one leg of which is welded to the duct and the other leg of which extends at a right angle to the duct surface and a rubber strip 70 which is cemented to the L-section strip. On the underside of the duct, a strip 71 of U-shaped cross-section is spot welded to the duct surface with its flanges extending at right angles thereto. A U-shaped rubber lining 72 is cemented within the strip to embrace the upper edge of the rearward portion 19 of the window 13a of the motor vehicle.

The operation of the invention will be readily understood in view of the above description. The compressor 16 is mounted on engine block and its drive pulley 17 is rotated by the belt 18. The main housing 12 is attached to the automobile 11 by rolling the rearward portion 19 of the window 13a downwardly a short distance and inserting the duct 24 through the generally rectangular opening formed thereby. The rubber strip 70 is inserted in the groove which is situated around the edge of the window and which is occupied by the glass when the window is closed. The rubber lining 72 fits tightly around the upper edge of the window glass. Thus, sealing means is provided between the window opening and the duct so that very little leakage of air may take place. The main housing 24 is held securely in place by the clamping means 26 extending around the forward edge of the door, by the clamping means 37 connecting it to the rearward edge of the door, and the clamps 46 by which it is attached to the upper edge of the door. It is to be noted that little, if any, of the weight of the housing is carried by the window glass.

With the main housing 12 firmly attached to the motor vehicle, the tubes 14 and 15 leave the front of the housing, enter the hood, and are connected to the compressor. The system is filled with refrigerant in the usual manner and the substance flows through the elements; high pressure or compressed refrigerant leaves the compressor through the tube 15 when the engine is running and is driving the compressor. From the tube 15 it passes into the condenser 28 wherein the heat is removed; air passing throug the outer half 23 of the housing passes over the condenser and cools the refrigerant contained therein. The flow of air may be caused by the forward motion of the automobile or, when the automobile is standing still, by the fan 29 driven by the motor 30. The motor is turned on or off, as is necessary, by a control means such as a manually-operated automatic switch, not shown. The resilient mounting of the motor 30 on the springs 31 assures that undesirable vibrations are not transmitted from the motor to the housing. The refrigerant, after being cooled in the condenser, passes through the tube 40 and through a strainer 41 which serves to remove any foreign matter that may have entered the system. The refrigerant then passes through the capillary tube 42 which acts as a restriction or valve in the system. From there, the refrigerant expands within the evaporator 35, absorbing heat from the walls of the evaporator; when the motor 32 is started, by a switch not shown, the fan 33 causes air to circulate and to flow over the surfaces of the evaporator. These surfaces absorb heat from the air and thus, cool it. The air enters the duct 24 from the interior of the automobile through the louvers 38, passes over the portion of the evaporator lying in the part of the inner half 22 of the housing, which is forward of the wall 34, and enters the passage 36. The air flows longitudinally along the passage 36, over the fan 33, over the rear half of the evaporator and through the louvers 39 into the interior of the motor vehicle again. The cooling of the air causes a certain amount of water condensation on the evaporator surfaces, particularly if the humidity is high, and provision is made for this by providing a condensate drain 44 in the bottom of the housing and by sloping the bottom of the housing toward the drain. Condensate drips downwardly from the evaporator surfaces and falls to the bottom for removal. The condensate baffle 45 prevents any of this water from entering the car through the duct 24. The concurrent cooling and drying of the air provides for very comfortable conditions within the motor vehicle. The gradual changing of the air in the car, which is necessary, is accomplished by means of the other windows or usual air vents of the motor vehicle in the conventional manner. The refrigerant leaves the evaporator, passes through the receiver 43, and returns to the inlet side of the compressor 16 through the tube 14.

The operation of the clamping means 26 and 37 and the clamps 46 is self-evident. However, it should be noted that the notches 50 in the elongated member 49 of the clamping means 26 permit the length of the member to be easily selected for an optimum value. The set screws 54 hold the hook member 53 securely to the edge of the door and similar service is performed by set screws associated with the clamping means 37 and the clamps 46. These set screws are not accessible when the door is shut and locked and, thus, make more difficult the removal of the main housing by unauthorized persons. In the case of the alternative clamp 62 shown in Figures 10 and 11, means is provided for readily adjusting the vertical position of the housing; this is particularly helpful in assuring a close fit between the sealing means 25 and the glass groove of the door.

Figures 14 and 15 show a modified version of the invention in which a compressor 116 is mounted within the outer half 123 of a main housing 112. The compressor includes an integral electric motor 117 and the unit is resiliently mounted by means of springs 118. The motor is connected by wires, not shown, to the battery of the motor vehicle so that the unit may be operated, if necessary, when the engine is not running. The outlet side of the compressor is connected by a tube 114 to a condenser 128 which resides in the same half of the housing; this condenser must, of course, be somewhat shorter than the condenser 28 described in connection with the above-described embodiment of the invention, but the effective heat exchange capacity may be maintained the same by increasing the transverse cross-sectional area. A motor 130 and fan 129 are provided as before, as well as a strainer 141, a regulator valve 142, an evaporator 135, a curved multiblade paddlewheel-type fan 133 and a receiver 143. In addition, a duct 124 is provided and a sealing means 125 and clamping means 126, 137 and 146.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. An air conditioning apparatus for a motor vehicle comprising an elongated streamlined main housing, a refrigerating system associated with the housing, a longitudinal, vertical wall dividing the housing into two halves, a first half having openings at the ends for the direct flow therethrough of air from the exterior of the vehicle in the direction of the length of the car, means adapted on occasion to cause air to flow through the said first half when the vehicle is not moving, the condenser of the refrigerating system residing in the said first half, a second half having openings only into the interior of the vehicle, a fan mounted in the said second half to cause passage of air therethrough, the evaporator of the refrigerating system residing in the said second half so that the air leaves the interior of the vehicle, enters the said second half of the housing, passes over the evaporator, and returns to the interior of the vehicle, means for attaching the housing in an open window of the motor vehicle, and means sealing the housing within the window to precent the flow of air therearound.

2. An air conditioning apparatus as recited in claim 1, including a forward clamping means having a hook member to engage the forward edge of the door, a rearward clamping means having a hook member to engage the rearward edge of the door, the upper clamping means having a vertical portion which is vertically adjustably attached to the housing and a horizontal portion rigidly connecting the said vertical portion to the hook member.

3. An air conditioning apparatus for a motor vehicle comprising an elongated main housing adapted to be mounted in a generally horizontal aspect outwardly of a vehicle door, a refrigerating system associated with the housing, a vertical longitudinal wall dividing the housing into halves, a first half having openings for the flow therethrough of air from the exterior of the vehicle, the condenser of the refrigerating system residing in the said first half, a second half having openings only into the interior of the vehicle, and the evaporator of the refrigerating system residing in the second half, a fan mounted in the said second half to cause passage of air therethrough, so that the air leaves the interior of the vehicle, enters the second half of the housing, passes over the evaporator and returns to the interior of the vehicle, a duct leaving the housing, the duct being of relatively small height and considerable length to extend horizontally into the opening in a partly-opened window in the vehicle door, the duct being connected to the main housing in such a manner that most of the bulk of the housing is above the lowest surface of the duct, so that the view through the window is obscured to but a small extent, clamping means having hook members to engage the rearward, forward and upper edges of the door, and a sealing means extending around the duct and consisting of flexible members adapted to cooperate with the edges of the opening to prevent the flow of air therethrough.

4. An air conditioning apparatus for a motor vehicle comprising an elongated, cylindrical main housing adapted to be mounted outwardly of a vehicle door, a refrigerating system associated with the housing, a vertical longitudinal wall dividing the housing into two halves, the outer half having openings for the flow therethrough of air from the exterior of the vehicle, the condenser of the refrigerating system residing in the said outer half, an inner half having openings only into the interior of the vehicle, and the evaporator of the refrigerating system residing in the inner half, a fan mounted in the said inner half to cause passage of air therethrough, so that the air leaves the interior of the vehicle, enters the inner half of the housing, passes over the evaporator and returns to the interior of the vehicle, a duct of rectangular cross-section leaving the housing, the duct being of relatively small height and being coextensive with the housing, the duct being adapted to extend horizontally into the opening in a partly-opened window in the vehicle door, the duct being connected to the main housing in such a manner that the entire housing is above the bottom of the duct, so that the view through the window is obscured to but a small extent, clamping means having hook members to engage the rearward, forward and upper edges of the door, and a sealing means extending around the duct and consisting of flexible members adapted to cooperate with the edges of the opening to prevent the flow of air therethrough.

5. An air conditioning apparatus for a motor vehicle comprising an elongated, streamlined main housing, a refrigerating system associated with the housing, a longitudinal, vertical wall dividing the housing into two halves, a first half having openings for the direct flow therethrough of air from the exterior of the vehicle in the direction of the length of the vehicle, the condenser of the refrigerating system residing in the said first half, a second half having openings only into the interior of the vehicle, and the evaporator of the refrigerating system residing in the said second half, a fan mounted in the said second half to cause passage of air therethrough, so that the air leaves the interior of the vehicle, enters the second half of the housing, passes over the evaporator, and returns to the interior of the vehicle, means for attaching the housing in an open window of the motor vehicle, means sealing the housing within the window to prevent the flow of air, a duct leaving the housing, the duct being of relatively small height and considerable length which extends horizontally into the opening in a partially-opened window of the vehicle, the duct being connected to the main housing in such a manner that most of the bulk of the housing is above the lowest surface of the duct, so that the view through the window is obscured but to a small extent.

6. An air conditioning apparatus for a motor vehicle comprising an elongated, streamlined main housing, a refrigerating system associated with the housing, a longitudinal, vertical wall dividing the housing into two halves, a first half having openings for the direct flow therethrough of air from the exterior of the vehicle in the direction of the length of the vehicle, the condenser of the refrigerating system residing in the said first half, a second half having openings only into the interior of the vehicle, and the evaporator of the refrigerating system residing in the said second half, a fan mounted in the said second half to cause passage of air therethrough, so that the air leaves the interior of the vehicle, enters the second half of the housing, passes over the evaporator, and returns to the interior of the vehicle, means for attaching the housing in an open window of the motor vehicle, means sealing the housing within the window to prevent the flow of air therearound, a duct leaving the housing, the duct being of relatively small height and being generally co-extensive with the housing, the duct being adapted to extend horizontally into the opening in a partially-opened window of the vehicle, the duct being connected to the main housing in such a manner that most of the bulk of the housing is above the lowest surface of the duct so that the view through the window is obscured but to a small extent.

7. An air conditioning apparatus for a motor vehicle comprising an elongated, streamlined main housing, a refrigerating system associated with the housing, a longitudinal, vertical wall dividing the housing into two halves, a first half having openings for the direct flow therethrough of air from the exterior of the vehicle in the direction of the length of the vehicle, the condenser of the refrigerating system residing in the said first half, a second half having openings only into the interior of the vehicle, and the evaporator of the refrigerating system residing in the said second half, a fan mounted in the said second half to cause passage of air therethrough, so that the air leaves the interior of the vehicle, enters the second half of the housing, passes over the evaporator, and returns to the interior of the vehicle, means for attaching the housing in an open window of the motor vehicle, means sealing the housing within the window to prevent the flow of air therearound, a forward clamping means having a hook member to engage the forward edge of the door, the rearward clamping means having a hook member to engage the rearward edge of the door, and an upper clamping means having at least one hook portion to engage the upper edge of the door.

8. An air conditioning apparatus for a motor vehicle comprising an elongated, streamlined main housing, a refrigerating system associated with the housing, a longitudinal, vertical wall dividing the housing into two halves, a first half having openings for the direct flow therethrough of air from the exterior of the vehicle in the direction of the length of the vehicle, the condenser of the refrigerating system residing in the said first half, a second half having openings only into the interior of the vehicle, and the evaporator of the refrigerating system residing in the said second half, a fan mounted in the said second half to cause passage of air therethrough, so that the air leaves the interior of the vehicle, enters the second half of the housing, passes over the evaporator, and returns to the interior of the vehicle, means for attaching the housing in an open window of the motor vehicle, means sealing the housing within the window to prevent flow of air therearound, a duct leaving the housing, the duct being of relatively small height and considerable length for extension horizontally into the opening in a partially-opened window of the vehicle, the sealing means extending entirely around the duct and consisting of flexible members adapted to cooperate with the edges of the opening to prevent the flow of air therethrough.

9. An air conditioning apparatus for a motor vehicle comprising an elongated, streamlined main housing, a refrigerating system associated with the housing, a longitudinal, vertical wall dividing the housing into two halves, a first half having openings for the direct flow therethrough of air from the exterior of the vehicle in the direction of the length of the vehicle, the condenser of the refrigerating system residing in the said first half, a second half having openings only into the interior of the vehicle, and the evaporator of the refrigerating system residing in the said second half, a fan mounted in the said second half to cause passage of air therethrough, so that the air leaves the interior of the vehicle, enters the second half of the housing, passes over the evaporator, and returns to the interior of the vehicle, means for attaching the housing in an open window of the motor vehicle, and means sealing the housing within the window to prevent the flow of air therearound, a duct of rectangular cross-section leaving the housing, the duct being of relatively small height and considerable length to extend horizontally into the opening in a partially-opened window of the vehicle, the sealing means extending around the duct and adapted to cooperate with the edges of the opening to prevent the flow of air therethrough, the sealing means comprising a flexible strip extending away from the duct and adapted to be pressed into the groove in the door in which the glass would reside if the window were closed, this flexible strip extending from the side and top of the duct only, the sealing means further comprising a flexible strip extending from the bottom of the duct and having a U-shaped cross section, the last-named strip being attached to the duct with its flange extending therefrom to embrace the edge of the glass.

References Cited in the file of this patent

UNITED STATES PATENTS

| | | |
|---|---|---|
| 2,115,785 | Peo | May 3, 1938 |
| 2,189,391 | Bowdish | Feb. 6, 1940 |
| 2,223,884 | Bolan | Dec. 3, 1940 |
| 2,435,798 | Rice et al. | Feb. 10, 1948 |
| 2,453,018 | Kercheval | Nov. 2, 1948 |
| 2,501,273 | Goetz | Mar. 21, 1950 |
| 2,516,103 | Brown | July 26, 1950 |
| 2,525,869 | Corhanidis | Oct. 17, 1950 |
| 2,526,874 | Jones | Oct. 24, 1950 |
| 2,538,382 | Rielly | Jan. 16, 1951 |
| 2,576,549 | Wagner | Nov. 27, 1951 |
| 2,654,227 | Muffly | Oct. 6, 1953 |
| 2,767,638 | Davis | Oct. 23, 1956 |
| 2,780,928 | Bullock | Feb. 12, 1957 |